United States Patent
Brown et al.

(10) Patent No.: US 6,824,188 B1
(45) Date of Patent: Nov. 30, 2004

(54) SUN VISOR ASSEMBLY WITH VANITY MIRROR BROW

(75) Inventors: Lee Brown, Quincy, MI (US); James J. Hobson, Jonesville, MI (US)

(73) Assignee: Crotty Corporation, Quincy, MI (US)

( * ) Notice: Subject to any disclaimer, the term of this patent is extended or adjusted under 35 U.S.C. 154(b) by 0 days.

(21) Appl. No.: 10/388,242

(22) Filed: Mar. 13, 2003

Related U.S. Application Data

(60) Provisional application No. 60/364,201, filed on Mar. 14, 2002.

(51) Int. Cl.[7] .................................................. B60J 3/00
(52) U.S. Cl. .................... 296/97.2; 296/97.5; 296/97.1; 362/492
(58) Field of Search ............................... 296/97.2, 97.5, 296/97.1, 97.12; 362/492, 135

(56) References Cited

U.S. PATENT DOCUMENTS

| | | | | |
|---|---|---|---|---|
| 5,059,016 A | * | 10/1991 | Lawassani et al. | 296/97.5 |
| 5,078,445 A | * | 1/1992 | VandenBerge et al. | 296/97.1 |
| 5,205,639 A | * | 4/1993 | White et al. | 296/97.2 |
| 5,267,090 A | * | 11/1993 | Dowd et al. | 296/97.5 |
| 5,331,518 A | * | 7/1994 | Roark et al. | 362/492 |
| 5,338,082 A | * | 8/1994 | Miller | 296/97.2 |
| 5,430,624 A | * | 7/1995 | Yoshida et al. | 362/492 |
| 5,528,470 A | * | 6/1996 | White | 362/135 |
| 5,890,792 A | * | 4/1999 | Finn et al. | 362/492 |
| 5,927,792 A | * | 7/1999 | Welling et al. | 296/97.5 |
| 6,033,005 A | * | 3/2000 | Crotty, III | 296/97.1 |
| 6,076,947 A | * | 6/2000 | Miller | 362/492 |
| 6,254,168 B1 | * | 7/2001 | Crotty, III | 296/97.2 |
| 6,264,352 B1 | * | 7/2001 | Zapinski | 362/492 |
| 2004/0022137 A1 | * | 2/2004 | Campbell et al. | 369/1 |

* cited by examiner

*Primary Examiner*—Kiran Patel
(74) *Attorney, Agent, or Firm*—Rader, Fishman & Grauer, PLLC

(57) ABSTRACT

A sun visor assembly is provided that includes a foundation having a pair of foundation halves. An upholstery cover extends over each of the foundation halves to form an outer of the sun visor. A vanity mirror brow is disposed over one of the foundation halves under the cover, such that a portion of the cover is raised off of the foundation. A vanity mirror assembly is disposed over the cover assembly adjacent the vanity mirror brow. The addition of the vanity mirror brow between the foundation and the cover gives the perception that at least a portion of the vanity mirror assembly is attractively recessed into the foundation.

2 Claims, 6 Drawing Sheets

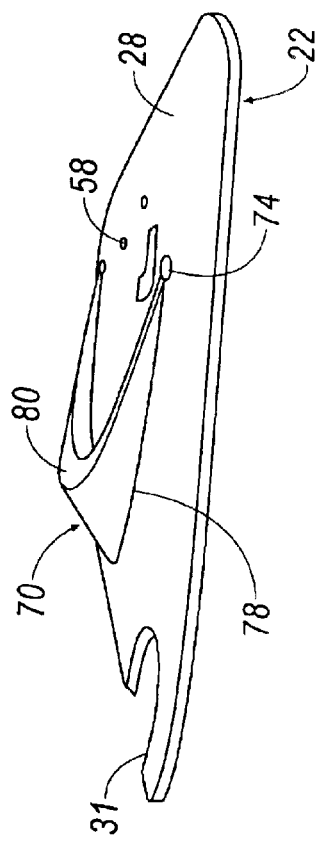
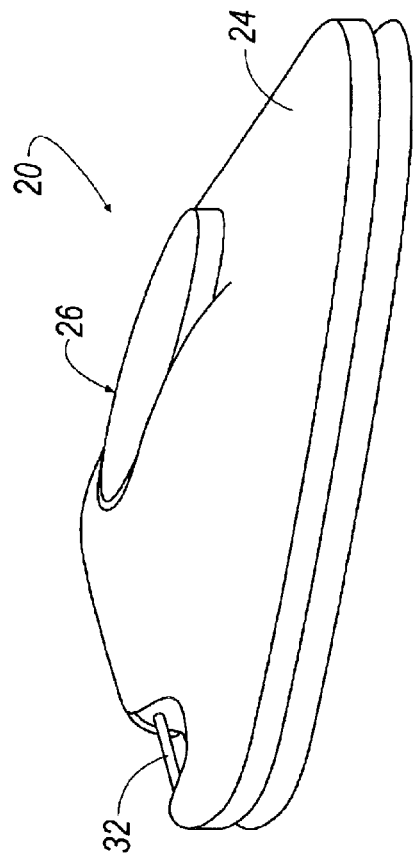
FIG. 5
FIG. 6

SUN VISOR ASSEMBLY WITH VANITY MIRROR BROW

RELATED APPLICATIONS

This application claims priority to U.S. provisional application 60/364,201 filed on Mar. 14, 2002, which is incorporated by reference in its entirety.

BACKGROUND OF THE INVENTION

1. Field of the Invention

The present invention relates generally to a sun visor assembly for use in a vehicle and, more particularly, to a sun visor assembly having a vanity mirror assembly and a mirror brow that gives the perception that the vanity mirror assembly is recessed into the foundation.

2. Description of the Related Art

It is well known to provide a sun visor for the windshield of a vehicle, wherein the sun visor is mounted on a roof panel of the vehicle for movement between a storage position adjacent the vehicle headliner, a first use position adjacent the windshield and a second use position adjacent a side-door window opening.

In one known sun visor assembly, a sun visor body is provided that includes a substantially flat outer cover assembly, which folds unto itself and sandwiches a core member therebetween. The exterior cover assembly is made of a cloth or vinyl upholstery covering, which is bonded to a semi-rigid foundation, typically formed of kraft paper or cardboard. The core member is disposed between the foundation halves and connects to a support rod, which in turn connects to the roof panel of the vehicle. A vanity mirror assembly is affixed to the foundation over the cover, as is well known in the art.

Sun visor assemblies employing a relatively thin foundation, as described above, generally require the vanity mirror assembly to protrude outward from the surface of the cover. For cosmetic reasons, certain sun visor applications require the vanity mirror assembly be recessed into the foundation, such that at least a portion of the vanity mirror assembly is flush with the outer cover. In sun visors that include a relatively thin foundation or a relatively thick core member between the foundation halves, the ability to attractively recess the vanity mirror assembly into the foundation is limited or unavailable.

SUMMARY OF THE INVENTION

The present invention overcomes the limitations of the prior art by providing a sun visor assembly that includes a vanity mirror brow. The vanity mirror brow raises a portion of an outer cover adjacent the vanity mirror assembly away from the sun visor foundation, giving the perception that the vanity mirror is attractively recessed into the foundation.

In an embodiment of the present invention, a sun visor assembly is provided that includes a foundation having a pair of foundation halves. An upholstery cover extends over each of the foundation halves to form an outer surface of the sun visor. The vanity mirror brow is secured to one of the foundation halves under the cover, such that a portion of the cover is raised off of the foundation. A vanity mirror assembly is disposed over the cover adjacent the vanity mirror brow. The addition of the vanity mirror brow between the foundation and the cover gives the perception that at least a portion of the vanity mirror assembly is attractively recessed into the foundation.

BRIEF DESCRIPTION OF THE DRAWINGS

The above mentioned features of the present invention will become more apparent and the invention itself will be better understood by reference to the following description of the preferred embodiments of the invention taken in conjunction with the accompanying drawings, wherein:

FIG. 5 is a side view of an embodiment of the present invention, illustrating the mirror brow connected to the foundation.

FIG. 6 is a side view of the sun visor assembly of FIG. 1 showing the cover disposed over the vanity mirror brow and sun visor foundation, and a vanity mirror assembly disposed over the cover.

DESCRIPTION OF THE PREFERRED EMBODIMENTS

Figure 1:
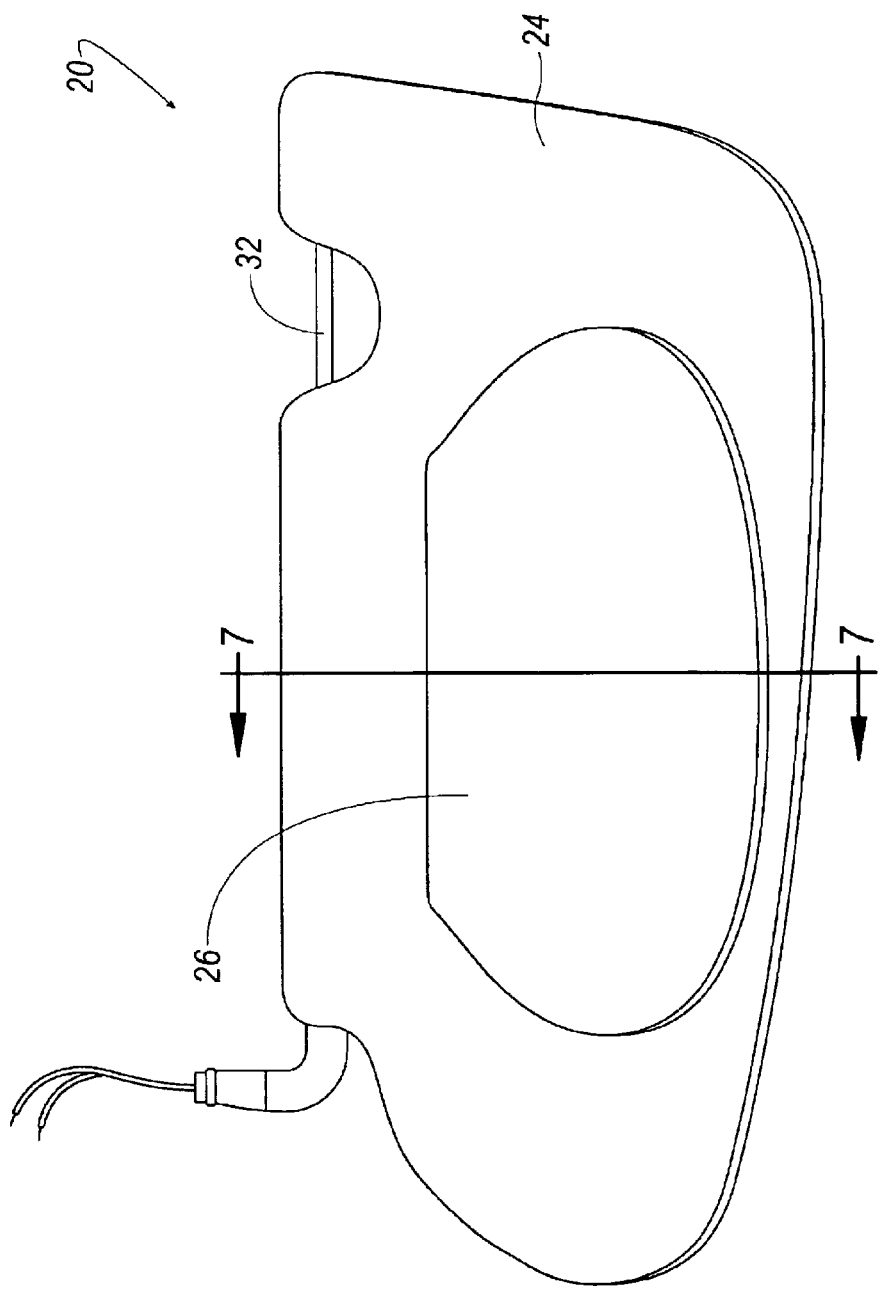
FIG. 1 is an elevational view of a sun visor assembly according to an embodiment of the present invention.

Referring now to the drawings, the preferred embodiments of the present invention are shown in detail. Although the drawings represent the preferred embodiments of the present invention, the drawings are not necessarily to scale and certain features may be exaggerated to better illustrate and explain the present invention. Further, the embodiments set forth herein are not intended to be exhaustive or otherwise limit the invention to the precise forms shown in the drawings and disclosed in the following detailed description.

Figure 2:
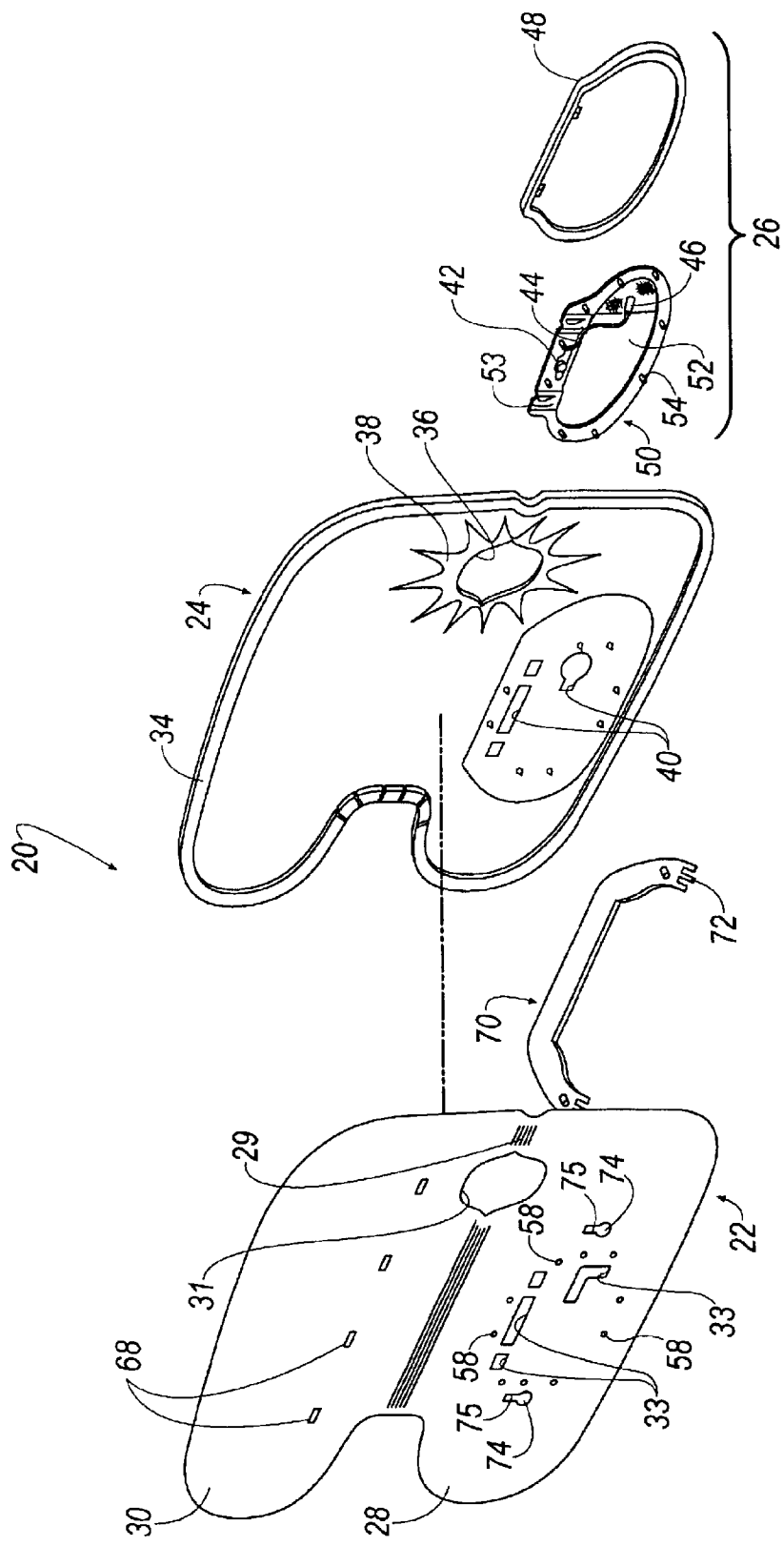
FIG. 2 is an exploded perspective view of a sun visor assembly according to an embodiment of the present invention.

Referring to FIGS. 1 and 2, a sun visor assembly 20 is provided that includes a foundation 22 having a cover 24 that forms an exterior surface of sun visor assembly 20 and a vanity mirror assembly 26 disposed over the cover. In the disclosed embodiment, foundation 22 is made of a rigid or semi-rigid material, such as kraft paper or cardboard, having a thickness of about 0.080 inches. However, the thickness of foundation 22 may vary depending on the strength and rigidity of the material used.

Referring to FIG. 2, foundation 22 includes two halves 28 and 30. Foundation halves 28, 30 may be integrally formed, as shown in FIG. 2, or may be discrete and attached together during assembly of sun visor assembly 20, as is known in the art. When halves 28 and 30 are integrally formed, foundation 22 is folded unto itself about one or more score lines 29 that define a "living hinge" between foundation halves 28, 30. Foundation 22 also includes a cut-out 31 to accommodate a pin assembly 32, and one or more apertures 33 to accommodate various components of vanity mirror assembly 26.

Cover 24 is a decorative upholstery material, such as a cloth fabric bonded to a foam backing, as is known in the art. Cover 24 includes a peripheral edge 34 that folds around the periphery of foundation 22 and is adhesively or otherwise bonded thereto. During visor construction, a second adhesive is applied around the interior periphery of foundation 22 and halves 28 and 30 are folded about score lines 29 and bonded together. Cover 24 includes an aperture 36 that matches cut-out 31 to accommodate pin assembly 32. Cover 24 includes a saw-tooth edge 38 that folds to the inside of foundation 22 and is bonded thereto by the same adhesive used for edge 34. Optionally, apertures 40 can be precut into cover 24 to facilitate a wiring switch assembly 42, wires 44 and lighting fixture 46 shown on the back of vanity mirror assembly 26.

Still referring to FIG. 2, vanity mirror assembly 26 includes a vanity cover 48 hingably attached to a mirror body 50 that includes a mirror 52 (backside of mirror 52 shown in FIG. 2). As is known in the art, mirror body 50 includes hinge clips 53 having fingers that extend through notches in mirror body 50 to facilitate opening and closing of cover 48. Heat stakes 54 extend from the backside of mirror body 50 and, during assembly of vanity mirror assembly 26 to the sun visor assembly 20, "punch" through cover 24 and are received in holes 58 in foundation 22. Using heat stake technology, stakes 54 are then fused into holes 58 to secure vanity mirror assembly 26 to sun visor assembly 20. While the illustrated embodiment discloses stakes being formed on the back of the vanity and the holes being formed in foundation 22, it is envisioned that the converse of this arrangement would also work satisfactorily. That is, the stakes could be formed in foundation 22 and the holes formed in the back of the vanity mirror assembly. It will also be appreciated that other means known in the art may be used to secure vanity mirror assembly 26 to foundation 22, such as snap-together fasteners.

Figure 3:
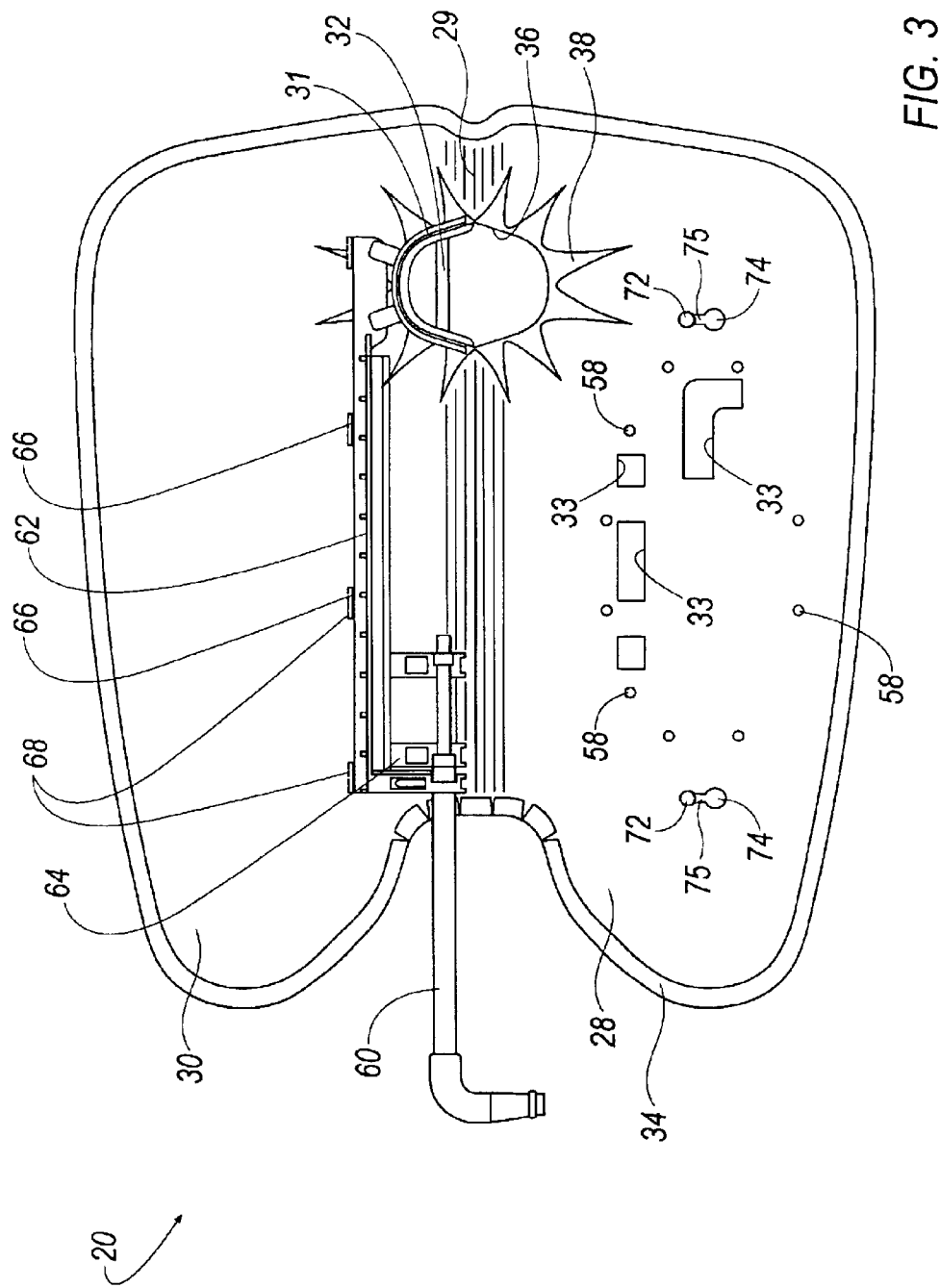
FIGS. 3 is a plan view of a sun visor assembly according to an embodiment of the present invention, illustrating the interior portions of the sun visor before the two foundation halves are folded together in final assembly.

Various core components, such as a sun visor support rod 60, a support bracket 62 and a hinge block 64, are provided between foundation halves 28 and 30. A support bracket and hinge block similar to that disclosed in FIG. 3 are known in the art and are described, for example, in U.S. Pat. No. 5,823,603, owned by the assignee of the present invention, the disclosure of which is hereby incorporated by reference in its entity. Support bracket 62 includes feet 66, which are received in slots 68 formed in foundation half 30 (FIG. 3), thereby holding support bracket 62 in place. Generally, the addition of core components, such as support bracket 62 and hinge block 64, does not add significantly to the thickness of sun visor assembly 20, even though the core components may occupy a substantial portion of the space between halves 28 and 30.

Due to the relatively thin cross-section of sun visor assembly 20, the space occupied by the core component(s) and the relatively limited space defined between foundation halves 28 and 30, vanity mirror assembly 26 is placed over foundation 22 and cover 24. To give the perception that at least a portion of vanity mirror assembly 26 is attractively recessed into foundation 22, a vanity mirror brow 70 is disposed between foundation 22 and cover 24. In the embodiment illustrated in the drawings, vanity mirror brow 70 is hidden under cover 24 and vanity mirror assembly 26 is disposed over cover 24 within the perceived recess created by brow 70. In this manner, cover 24 is raised off of foundation 22 around at least a portion of vanity mirror assembly, so that it appears vanity mirror assembly 26 is recessed into foundation 22, when in fact it is not.

Vanity mirror brow 32 is manufactured out of a rigid or semi-rigid material, such as ABS plastic, and is affixed to foundation half 28 to prevent movement of brow 70 under cover 24. In the disclosed embodiment, brow 70 includes at least one foot 72 that is inserted into an aperture 74 in foundation half 28. To lock brow 70 to foundation 22, brow 70 is then slid upwardly such that a portion of foot 72 is engaged with foundation 22. Foot 72 may then be heat staked or adhered to foundation 22 to prevent movement of brow 70. Alternatively, other suitable means may be used to attach brow 70 to foundation 22, including without limitation, adhering the body of brow 70 to foundation 22 using a suitable adhesive.

Figure 4:
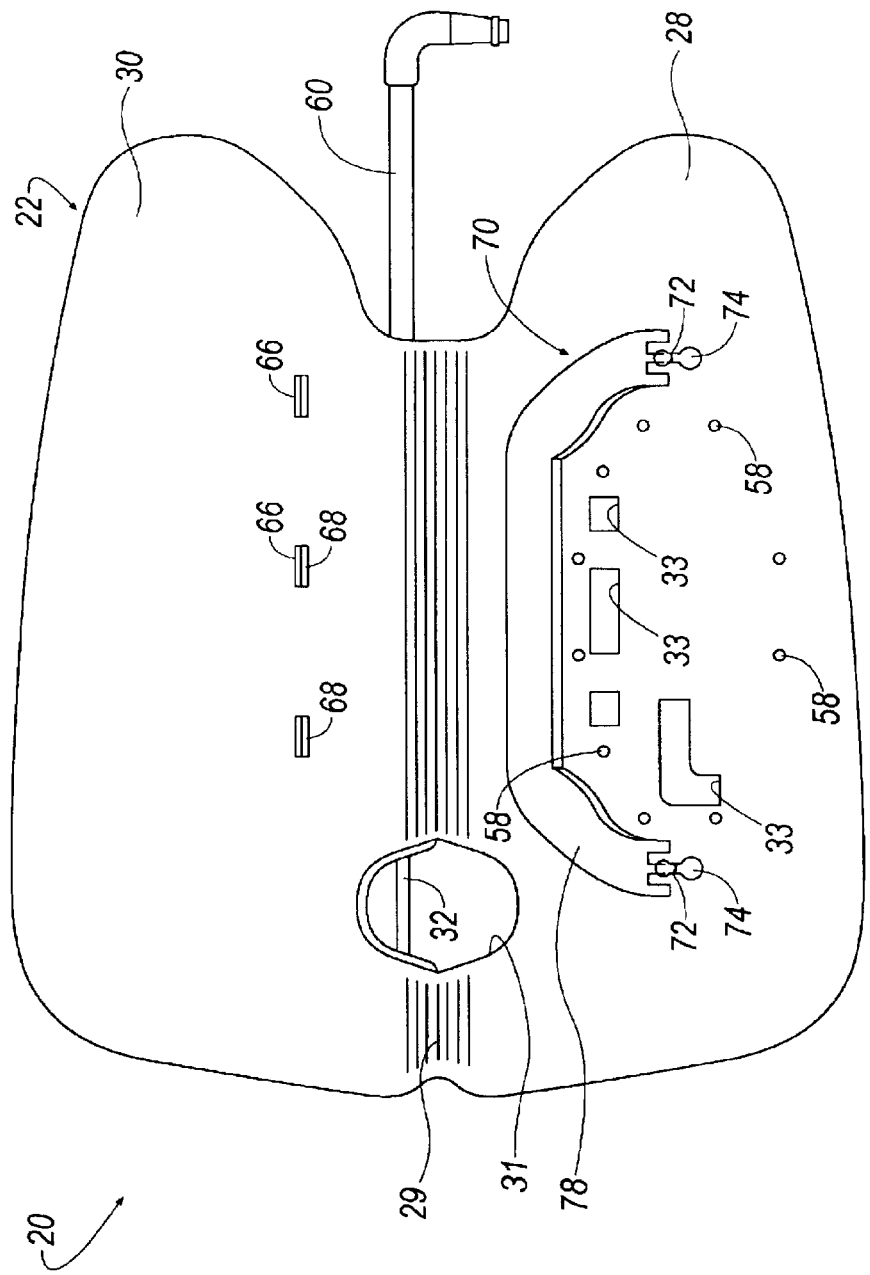
FIG. 4 is a plan view of a sun visor according to an embodiment of the present invention, illustrating the exterior of the foundation and a vanity mirror brow.
Figure 7:
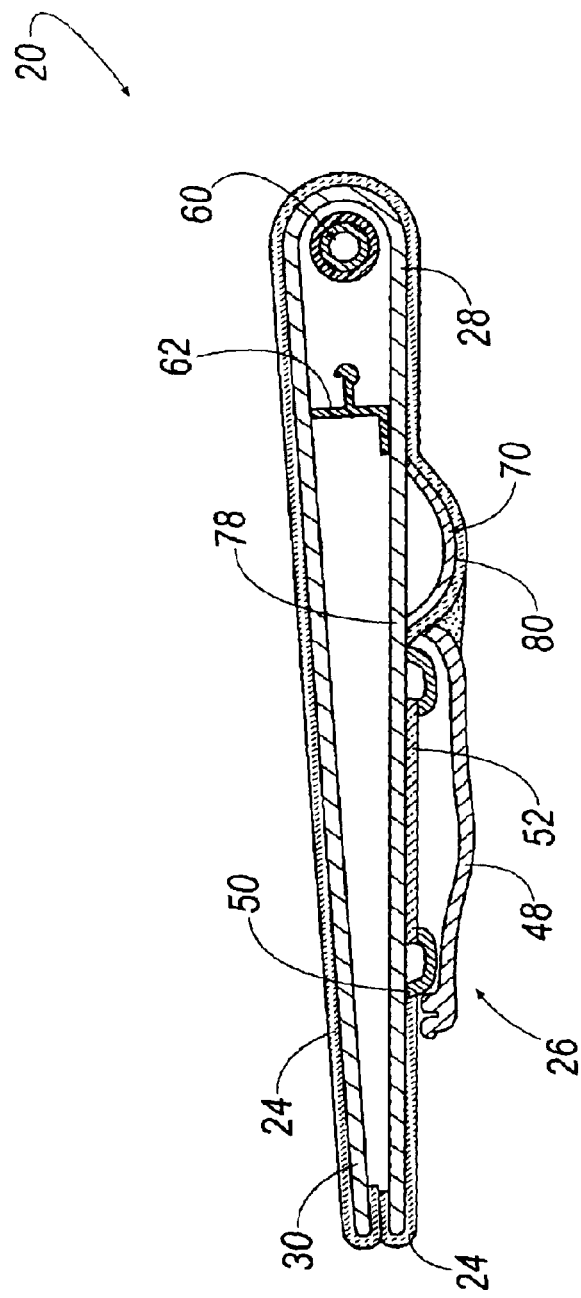
FIG. 7 is a cross-sectional view taken along line 7—7 in FIG. 1.

As illustrated in FIGS. 4 and 5, brow 70 includes a substantially flat base 78 and a contoured outer surface 80 opposite the substantially flat base. In the disclosed embodiment, base 78 is defined by a bottom edge of contoured outer surface 80. Contoured outer surface 80 tapers downwardly as it extends from an upper edge of vanity mirror assembly 26 toward a lower edge of vanity mirror assembly 26. However, the height and shape of contoured surface 80 is ultimately dependent on, for example, the height and shape of vanity mirror assembly 26, the desired depth of the perceived recess created by brow 70, and the overall size of sun visor assembly 20. Brow 70 may be configured to surround only a portion of mirror assembly 26, as illustrated in the drawings or, alternatively, may be configured to surround the entire periphery of vanity mirror assembly 26.

The recessed appearance of vanity mirror assembly 26 will be better appreciated with reference to the method of assembly of sun visor assembly 20. In the disclosed embodiment, the "butterfly" or folded-over foundation 22 is formed in accordance with conventional methods well-known in the art. Notably, slots 68, holes 33, 58, 74 and cut-out 31 are punched into foundation 22 by conventional means prior to cover 24 being adhered thereto.

After the required features have been punched into foundation 22, vanity mirror brow 70 is secured to foundation half 28, as described above. As an optional step, desirable when the vanity mirror includes lighting as in the disclosed embodiment, apertures 40 (FIG. 3) may be pre-formed into cover 24 before it is adhered to foundation 22. Advantageously, cover 24 is stretched over brow 70 such that only edge 34 of cover 24 and saw-tooth edge 38 need be adhered to foundation 24. Any one of several adhesives known in the art can be used for this purpose.

After cover 24 is adhered to foundation 22 over mirror brow 70, the core components of sun visor assembly 20 are positioned within foundation 22. Support bracket 62, hinge block 64 and pin assembly 32 can be pre-assembled and then placed into foundation 22 so that feet 66 fit into slots 68 and pin assembly 32 is received in cut-out 31. Next, vanity mirror assembly 26 can be positioned in the perceived recess created by brow 70 and stakes 54 fused into holes 82 in foundation 22. Advantageously, cover 24 is held securely in place between foundation 22 and the back of vanity mirror assembly 26.

Finally, adhesive can be applied proximate the edge of halves 28 and 30, foundation 22 folded and then held together until the adhesive cures. Many suitable adhesives are known in the art and can be used to secure foundation halves together, such as Plio Grip urethane sold by Ashland Chemical Company. The core components, such as support bracket 60 and hinge block 62, are held securely between foundation halves 28 and 30 in the assembled sun visor.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variations and modifications are within its spirit and the scope as defined by the claims.

What is claimed is:

1. A sun visor assembly comprising:
   a sun visor foundation;
   a vanity mirror assembly; and
   a vanity mirror brow surrounding at least a portion of the vanity mirror assembly such that at least a portion of the vanity mirror assembly is perceived to be recessed into the foundation, wherein the vanity mirror brow includes a substantially flat base and a contoured outer surface opposite the substantially flat base.

2. The sun visor assembly of claim 1, wherein the contoured outer surface tapers downwardly as it extends from an upper edge of the vanity mirror assembly toward a lower edge of the vanity mirror assembly.

* * * * *